(12) United States Patent
Ma et al.

(10) Patent No.: US 11,441,981 B2
(45) Date of Patent: Sep. 13, 2022

(54) TESTING DEVICE AND TESTING METHOD FOR ADHESIVE STRENGTH OF INNER HOLE COATING

(71) Applicant: Army Academy of Armored Forces, Beijing (CN)

(72) Inventors: Guozheng Ma, Beijing (CN); Haidou Wang, Beijing (CN); Pengfei He, Beijing (CN); Xianyong Zhu, Hangzhou (CN); Ming Liu, Beijing (CN); Ling Tang, Jinping Town (CN); Shuyu Ding, Jianyang (CN); Hengheng Xi, Yaohe Town (CN); Li Zhou, Luzhou (CN); Tao Liu, Nanchang (CN)

(73) Assignee: ARMY ACADEMY OF ARMORED FORCES, Beijing (CN)

( * ) Notice: Subject to any disclaimer, the term of this patent is extended or adjusted under 35 U.S.C. 154(b) by 348 days.

(21) Appl. No.: 16/891,451

(22) Filed: Jun. 3, 2020

(65) Prior Publication Data
US 2021/0255077 A1     Aug. 19, 2021

(30) Foreign Application Priority Data
Feb. 18, 2020 (CN) .......................... 202010098476.9

(51) Int. Cl.
| | |
|---|---|
| G01N 3/08 | (2006.01) |
| G01N 19/04 | (2006.01) |
| G01N 3/24 | (2006.01) |
| G01N 3/02 | (2006.01) |

(52) U.S. Cl.
CPC ................ *G01N 3/08* (2013.01); *G01N 3/02* (2013.01); *G01N 19/04* (2013.01); *G01N 3/24* (2013.01); *G01N 2203/0017* (2013.01); *G01N 2203/04* (2013.01)

(58) Field of Classification Search
CPC ........... G01N 19/04; G01N 3/02; G01N 3/08; G01N 3/24; G01N 2203/0017; G01N 2203/04
See application file for complete search history.

(56) References Cited

U.S. PATENT DOCUMENTS

| 7,329,900 B2 * | 2/2008 | Yeh ........................ G01N 19/04 |
| --- | --- | --- |
| | | 73/842 |
| 7,448,279 B2 * | 11/2008 | Brinz ...................... G01N 3/08 |
| | | 73/842 |
| 2005/0193829 A1 * | 9/2005 | Brinz ...................... G01N 3/08 |
| | | 73/794 |
| 2006/0231834 A1 * | 10/2006 | Yeh .......................... G01N 3/00 |
| | | 257/48 |

* cited by examiner

*Primary Examiner* — Jonathan M Dunlap

(57) ABSTRACT

Disclosed are a testing device and a testing method for adhesive strength of an inner hole coating. A pull rod of the testing device for the adhesive strength of the inner hole coating may apply an axial tension to the inner hole coating via a guide ring and an assisting assembly, and may also apply radial pressure to the inner hole coating via a tapered surface and the assisting assembly. And the press rod may apply a radial tension to the inner hole coating via the pull hook and the assisting assembly. The testing method for the adhesive strength of the inner hole coating adopts the above-mentioned testing device for adhesive strength of an inner hole coating, a tensile adhesive strength test and a shear adhesive strength test may be performed on a same device.

18 Claims, 10 Drawing Sheets

TESTING DEVICE AND TESTING METHOD FOR ADHESIVE STRENGTH OF INNER HOLE COATING

CROSS-REFERENCES TO RELATED APPLICATIONS

This disclosure claims priority to Chinese patent application No. 202010098476.9 filed on Feb. 18, 2020, application of which is incorporated herein by reference in its entirety.

TECHNICAL FIELD

The present disclosure relates to the technical field of performance testing, in particular, a testing device and a testing method for adhesive strength of an inner hole coating.

BACKGROUND

In many important industrial fields, such as petrochemical, aerospace, weaponry and machinery manufacturing, there are many inner hole parts that are important to an overall structure, such as an automobile engine cylinder, a gas turbine casing, and a chemical petroleum pipeline. Some parts need to operate under severe conditions such as high temperature and high pressure, which require very high quality of inner hole of the part. In order to improve the quality of inner holes, various types of processes are often used to prepare coatings on the surfaces of inner holes for important inner hole parts in service.

Adhesive strength of the coating and a substrate is a very important indicator for evaluating the quality of the coating. If the adhesive strength of the coating does not meet a standard, the coating may peel off during service. In a light case, the coating will not protect the substrate, while in a heavy case, the entire part or the entire equipment may be caused to be scrapped. Therefore, it is very critical to perform an adhesive strength test on the coating before formal use.

The traditional coating adhesive strength test is mainly divided into tensile adhesive strength and shear adhesive strength. The tensile adhesive strength of the coating refers to an ultimate ability of the coating to withstand a tensile stress in a normal direction (perpendicular to a coating surface), and the shear adhesive strength of the coating refers to an ultimate ability of the coating to withstand shear stress in a tangential direction (along the coating surface). Most coatings operate under a state of relatively great shear stress, so the adhesive strength of the coating measured by a shear test is more in line with actual operating conditions, the tensile adhesive strength may more intuitively indicate the adhesive strength of the coating and the substrate, and a synergistic test of the two may more comprehensively evaluate the adhesive strength of the coating.

The shear adhesive strength test and tensile adhesive strength test in the related art have the following technical defects:

(1) the test is performed after the coating is sprayed on an outer edge or a plane, and a working condition is quite different from the inner hole coating on a curved surface with a certain curvature, therefore, a test result cannot evaluate the shear adhesive strength and a tensile adhesive strength of the inner curved coating and the substrate;

(2) before the coating adhesive strength test in the related art, a special load-holding device needs to be used in a gluing and heat-insulating stage to tightly adhere the coating to the gluing surface, and after the gluing is completed, the testing device needs to be switched, which is troublesome and time-consuming; and (3) the inner hole coating needs to test two kinds of adhesive strength to comprehensively evaluate the quality of the inner hole coating, however, it is inefficient to switch between different testing devices when testing the shear adhesive strength or tensile adhesive strength in the related art.

SUMMARY

An object of the present disclosure is to provide a testing device and testing method for adhesive strength of an inner hole coating, so as to solve a technical problem in the related art that an inner curved surface coating cannot be tested, and load-holding and testing devices need to be switched frequently.

Provided is a testing device for adhesive strength of inner hole coating, including:
  a positioning assembly configured to clamp a sample to be tested;
  a guide ring disposed at a center position of the sample to be tested, where the guide ring has a threaded hole disposed along an axial direction of the guide ring and a guide groove disposed along a radial direction of the guide ring, the guide groove is communicated with the threaded hole;
  an assisting assembly, where one end of the assisting assembly is inserted into the guide groove, and another end of the assisting assembly is adhesive to the inner hole coating of the sample to be tested;
  a pull rod threadedly connected to the threaded hole, where the pull rod has a hollow interior, a bottom end of the pull rod has a tapered surface, the pull rod is configured to apply an axial tension to the inner hole coating via the guide ring and the assisting assembly, and apply a radial pressure to the inner hole coating via the tapered surface and the assisting assembly;
  a press rod slidably disposed in the pull rod and coaxially disposed with the pull rod; and
  a pull hook rotatably connected to the guide ring, where a bottom end of the press rod is capable of being abutted against one end of the pull hook, and another end of the pull hook is capable of being abutted against the assisting assembly, and the press rod is capable of applying a radial tension to the inner hole coating via the pull hook and the assisting assembly.

In one embodiment, the assisting assembly includes:
  a conversion head inserted into the guide groove;
  a friction head adhesive to the inner hole coating; and
  a friction rod, where one end of the friction rod is fixedly connected to the conversion head, and another end of the friction rod is fixedly connected to the friction head.

In one embodiment, a limit protrusion is disposed on the conversion head, and the pull hook is capable of being abutted against the limit protrusion.

In one embodiment, a limit hole is disposed on the guide ring, the limit rod is threadedly connected inside the limit hole, and a bottom end of the limit rod is capable of being abutted against the conversion head.

In one embodiment, the positioning assembly includes:
  a base, where the sample to be tested and the guide ring each are disposed on the base; and
  an upper cover abutted against the sample to be tested, where the upper cover is locked to the base by a fastener, the upper cover is ring-shaped, and the pull rod and the press rod are capable of passing through the upper cover.

In one embodiment, a plurality of limit surfaces are annularly provided on an inner wall of the upper cover, and arranged in a stepped shape, and the sample to be tested is capable of being abutted against the plurality of limit surfaces.

In one embodiment, a positioning groove is disposed on the base, and one end of the sample to be tested is located in the positioning groove.

In one embodiment, the press rod includes a rod body and a limit portion disposed at a top end of the rod body, and a diameter of the limit portion is greater than a diameter of the rod body.

In one embodiment, at least two assisting assemblies are provided, and the at least two assisting assemblies are evenly distributed around a circumferential direction of the guide ring, and each assisting assemblies is provided with one guide groove and one pull hook, correspondingly.

Provided is a testing method for adhesive strength of an inner hole coating, which adopts the above-mentioned testing device for adhesive strength of an inner hole coating, and includes:

a preparing stage: pushing a pull rod inwardly along a threaded hole until a tapered surface abuts against a assisting assembly to apply a radial pressure to the assisting assembly via the pull rod, so that the assisting assembly is in close contact with the inner hole coating and keep in close contact with the inner hole coating for a set time, and resetting the pull rod;

a tensile adhesive strength test: applying a axial pressure to a press rod, so that the press rod slides along the pull rod to abut against one end of the pull hook and the pull hook rotates relative to a guide ring, then another end of the pull hook is abutted against the assisting assembly, so as to apply a radial tension to the assisting assembly, and then the inner hole coating is subjected to the radial tension; and recording a magnitude of the axial pressure on the press rod at a moment when the inner hole coating is peeled off; and a shear adhesive strength test: applying an axial tension to the pull rod, so that the axial tension is transmitted along the guide ring to the assisting assembly so as to apply the axial tension to the assisting assembly, then the inner hole coating is subjected to the axial tension; and recording a magnitude of the axial tension on the pull rod at a moment when the inner hole coating is peeled off.

The present disclosure has the following beneficial effects.

The testing device for the adhesive strength of the inner hole coating provided by the present disclosure tests the inner hole coating of the sample to be tested, and the test results may be used to evaluate the shear adhesive strength and the tensile adhesive strength between the inner curved surface coating and the substrate. Before testing the adhesive strength of the inner hole coating, the axial pressure on the pull rod is applied to the assisting assembly through the tapered surface to be converted into a radial pressure on the inner hole coating to achieve load-holding without switching devices, saving time and effort. And the tensile adhesive strength test and the shear adhesive strength test may be performed on the same device to save time and improve test efficiency.

Figure 1:
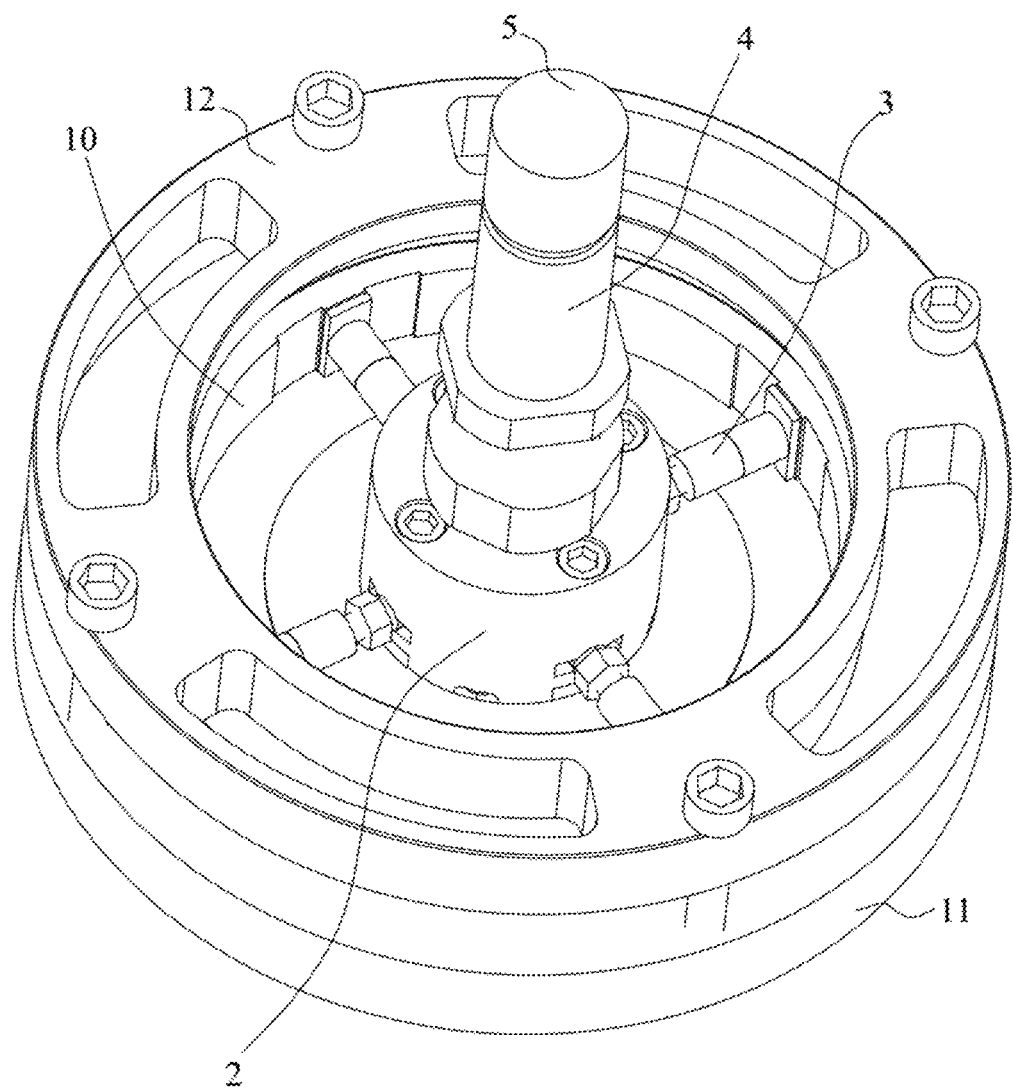
FIG. 1 is a structural schematic diagram of a testing device for adhesive strength of an inner hole coating according to an embodiment of the present disclosure.
Figure 2:
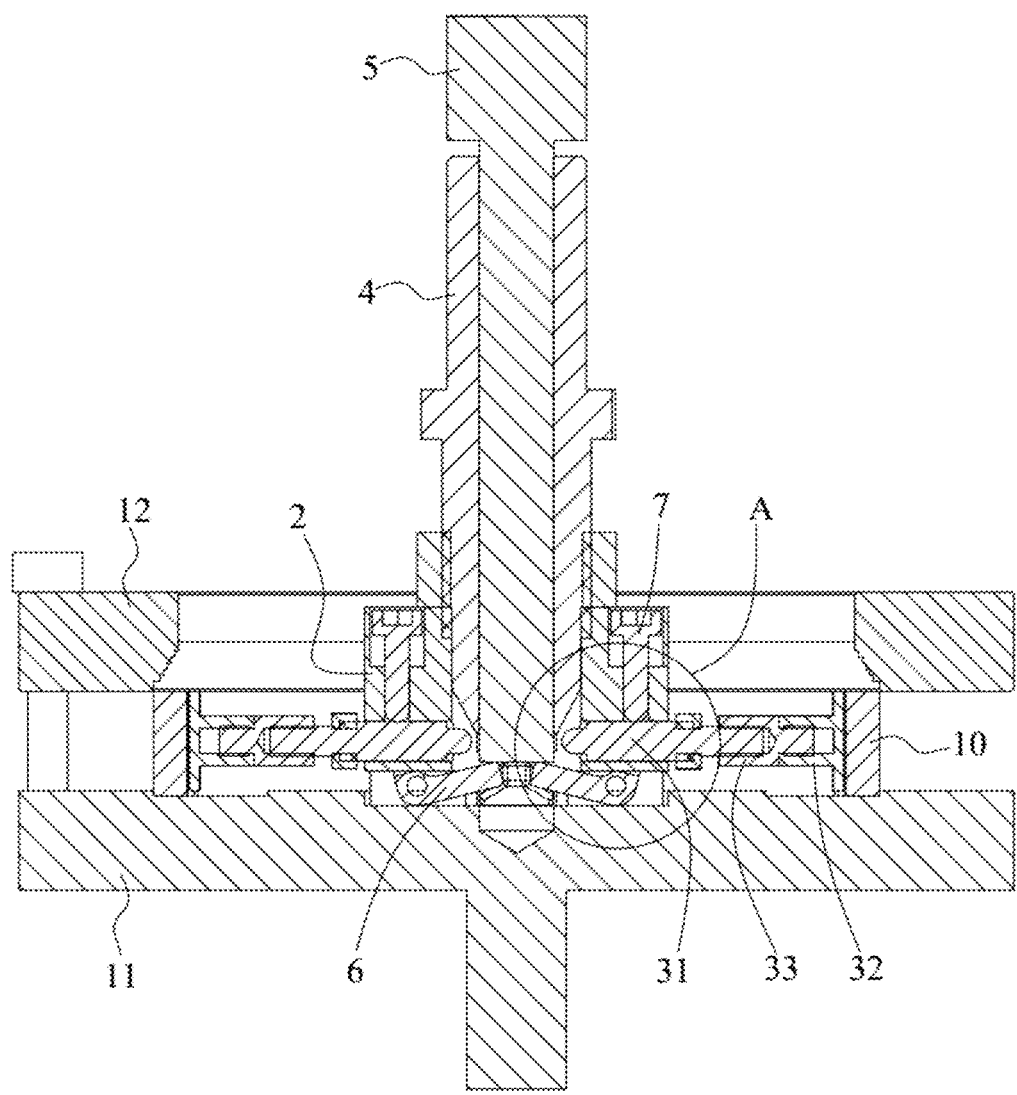
FIG. 2 is a sectional view of the testing device for adhesive strength of the inner hole coating according to an embodiment of the present disclosure.
Figure 3:
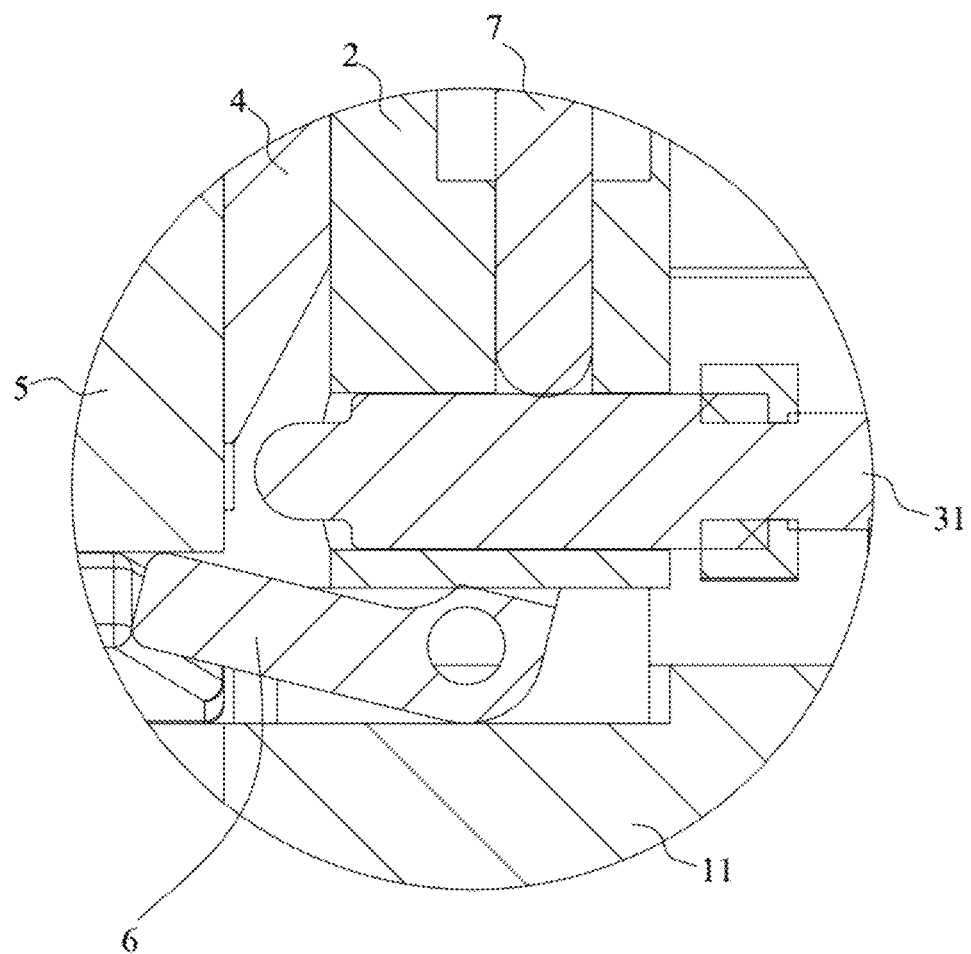
FIG. 3 is an enlarged view of a part A of FIG. 2.
Figure 4:
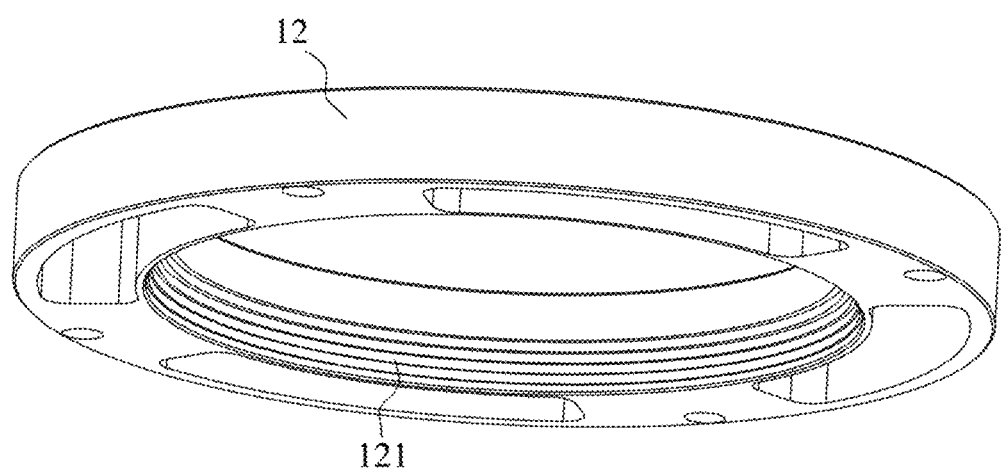
FIG. 4 is a structural schematic diagram of an upper cover according to an embodiment of the present disclosure.
Figure 5:
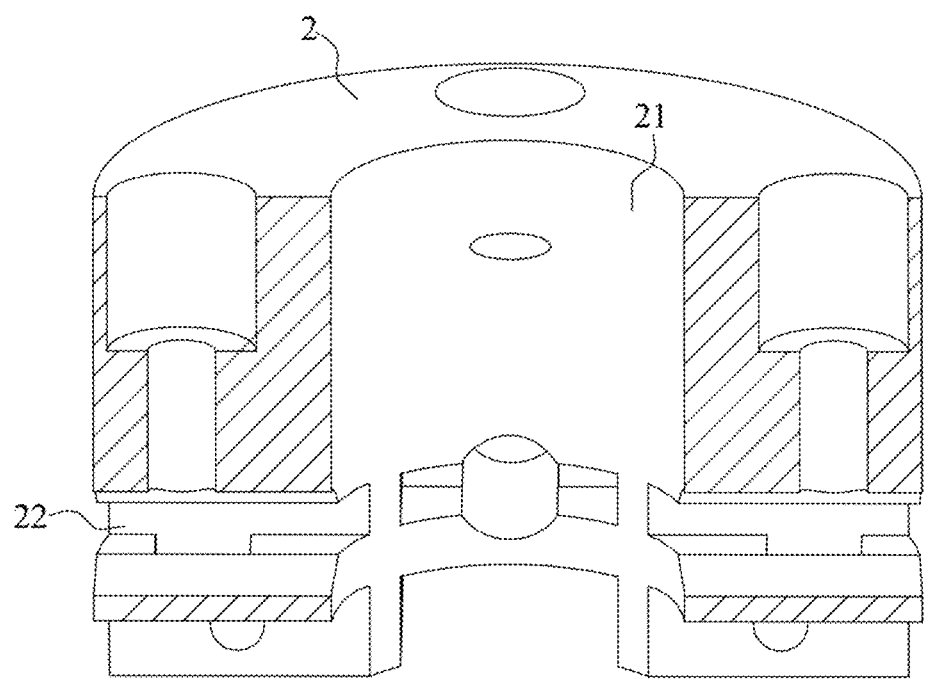
FIG. 5 is a sectional view of a guide ring according to an embodiment of the present disclosure.
Figure 6:
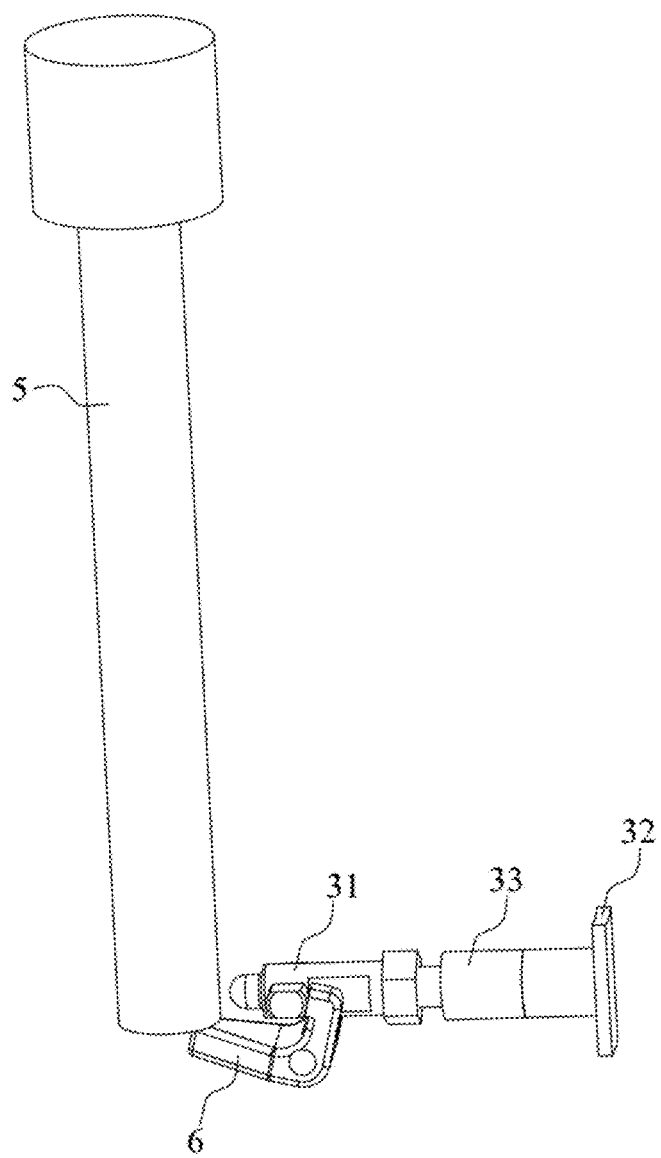
FIG. 6 is a partial structural schematic diagram I of the testing device for adhesive strength of the inner hole coating according to an embodiment of the present disclosure.
Figure 7:
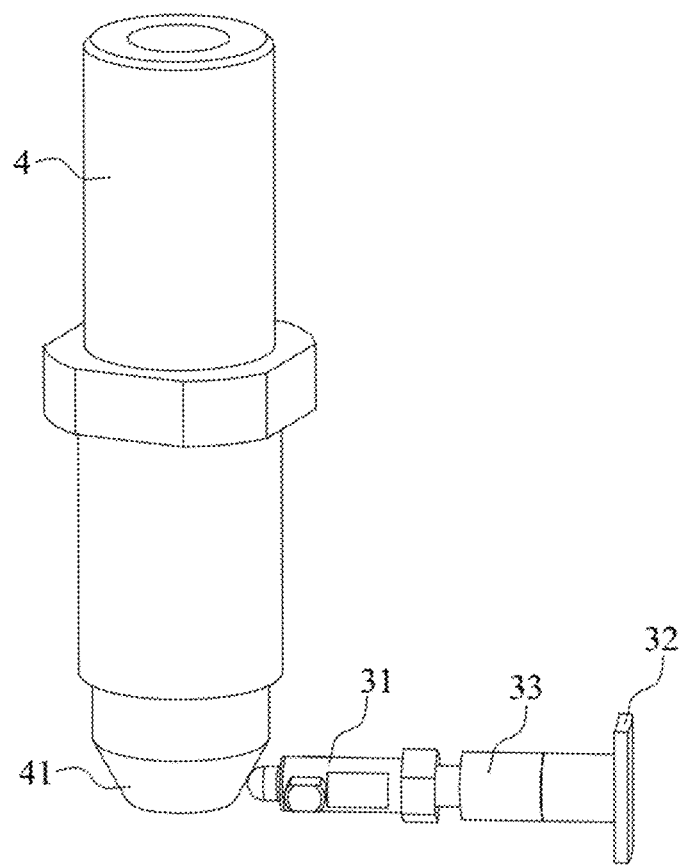
FIG. 7 is a partial structural schematic diagram II of the testing device for adhesive strength of the inner hole coating according to an embodiment of the present disclosure.
Figure 8:
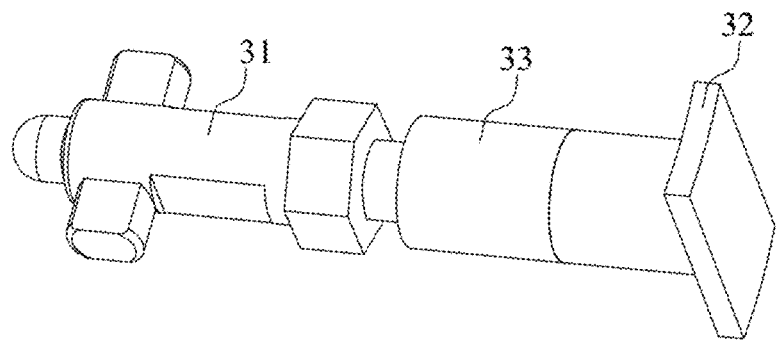
FIG. 8 is a structural schematic diagram of an assisting assembly according to an embodiment of the present disclosure.
Figure 9:
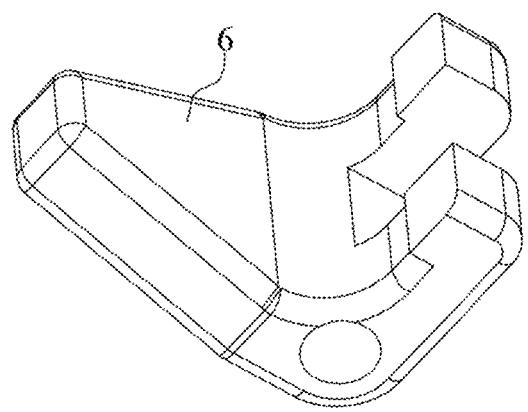
FIG. 9 is a structural schematic diagram of a pull hook according to an embodiment of the present disclosure.

In the drawings:
10. sample to be tested;
11. base; 12. upper cover; 121. limit surface;
2. guide ring; 21. threaded hole; 22. guide groove;
3. assisting assembly; 31. conversion head; 32. friction head; 33. friction rod;
4. pull rod; 41. tapered surface;
5. press rod;
6. pull hook;
7. connection rod.

DETAILED DESCRIPTION

Embodiments in accordance with the present disclosure will now be described in detail below. Examples of the embodiments are illustrated in the drawings, where the same or similar reference numerals indicate the same or similar elements or elements having the same or similar functions. The embodiments described below with reference to the drawings are merely exemplary, which are intended to explain the present disclosure but not to be construed as limiting the present disclosure.

In the description of the present disclosure, unless otherwise expressly specified and limited, the term "connected", "connection" or "fixed" is to be construed in a broad sense, for example, as fixedly connected, detachably connected, or integrated; mechanically connected or electrically connected; directly connected to each other or indirectly connected to each other via an intermediary; or internally connected or interactional between two components. For those skilled in the art, the preceding terms can be construed depending on specific contexts.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

The present disclosure will be further described below through specific embodiments in conjunction with the accompanying drawings.

Referring to FIGS. 1 to 9, provided is a testing device for adhesive strength of an inner hole coating. The testing device may perform load-holding on the inner hole coating and the gluing surface before testing so that the inner hole coating is in close contact with the gluing surface; the testing device may also test shear adhesive strength and tensile adhesive strength between an inner curved coating and a substrate, and may perform a tensile adhesive strength testing and a shear adhesive strength testing on the same device, thereby saving time and improving testing efficiency. In the present embodiment, the sample to be tested 10 is described as a cylinder sleeve. Apparently, the sample to be tested 10 may also be other components having inner holes, which are not described in detail herein.

The testing device for adhesive strength of the inner hole coating includes a positioning assembly, a guide ring 2, an assisting assembly 3, a pull rod 4, a press rod 5, and a pull hook 6, which are described in detail below.

The positioning assembly is configured for clamping the sample to be tested 10, so as to avoid the sample to be tested 10 from being displaced during the test. While the positioning assembly is clamping the sample to be tested 10, force of other components applied on the coating of the sample to be tested 10 will not be affected, and it is convenient to replace the sample to be tested 10 with different specifications.

The positioning assembly includes a base 11 and an upper cover 12, which are locked by a fastener, and the fastener may be a stud. The sample to be tested 10 is placed on the base 11, and the upper cover 12 is abutted against the sample to be tested 10. When the fastener is locked, the upper cover 12 and the base 11 are configured to clamp the sample to be tested 10. In the present embodiment, the base 11 has a circular disk shape. The upper cover 12 has a ring shape, which is convenient for placing other components.

A positioning groove is disposed on one side of the base 11, one end of the sample to be tested 10 is located in the positioning groove, and another end of the sample to be tested 10 is abutted against the upper cover 12. A positioning post is disposed on another side of the base 11, and an outer surface of the positioning post is provided with threads to facilitate clamping and loading of the tensile testing machine and avoid slipping during the test loading process.

A plurality of limit surfaces 121 are annularly disposed on an inner wall of the upper cover 12, and arranged in a stepped shape, and the sample to be tested 10 is capable of being abutted against the plurality of limit surfaces 121. Due to the ring-shaped limit surface 121, a periphery of the sample to be tested 10 may be comprehensively limited. The plurality of limit surfaces 121 are arranged in a stepped shape to limit the samples to be tested 10 with different outer diameters, and may be adapted to the samples to be tested 10 with various specifications to obtain the adhesive strength of coatings with different curvatures.

The guide ring 2 is placed on the base 11 and located at a center position of the sample to be measured 10. A limit groove is disposed on the base 11 corresponding to the guide ring 2, where one end of the guide ring 2 is located in the limit groove to prevent radial displacement of the guide ring 2. The guide ring 2 has a threaded hole 21 disposed along an axial direction of the guide ring and a guide groove 22 disposed along a radial direction of the guide ring, where the guide groove 22 is in communication with the threaded hole 21.

One end of the assisting assembly 3 is inserted into the guide groove 22, and another end of the assisting assembly 3 is adhesive to the inner hole coating of the sample to be tested 10; and force on the pull rod 4 and the press rod 5 may be transmitted to the assisting assembly 3 and then to the inner hole coating.

At least two assisting assemblies 3 are provided, and the at least two assisting assemblies 3 are evenly distributed around a circumferential direction of the guide ring 2, and each assisting assemblies 3 is provided with one guide groove 22 correspondingly. In the present embodiment, four assisting assemblies 3 are provided. The four assisting assemblies 3 may move synchronously along the radial direction, and simultaneously contact the inner hole coating to realize automatic centering.

The assisting assembly 3 includes a conversion head 31, a friction head 32, and a friction rod 33, where the conversion head 31 is inserted into the guide groove 22, the friction head 32 is adhesive to the inner hole coating, one end of the friction rod 33 is fixedly connected to the conversion head 31, and another end of the friction rod 33 is fixedly connected to the friction head 32. An adhesive layer is disposed between the friction head 32 and the inner hole coating to form the gluing surface for adhesion.

In one embodiment, one end of the friction head 32 is an arc surface, which is convenient to cooperate with the inner hole coating, and another end of the friction head 32 is threadedly connected to the friction rod 33. The friction rod 33 is threadedly connected to the conversion head 31, so that an extension length of the assisting assembly 3 in the radial direction may be adjusted to adapt to the samples to be tested 10 with different diameters. When a size of an inner diameter of the tested sample to be tested 10 is relatively large, a plurality of friction rods 33 may be combined to be used.

The pull rod 4 is threadedly connected to the threaded hole 21 on the guide ring 2, and may apply an axial tension to the inner hole coating via the guide ring 2 and the assisting assembly 3. The axial tension on the pull rod 4 is directly transmitted to the guide ring 2 through reversed locking of the thread, so as to transmit the axial tension to the inner hole coating via the assisting assembly 3.

Threads are disposed on an outer surface of a top end of the pull rod 4 to facilitate the pull rod 4 being clamped and loaded on a tensile testing machine. A square protrusion and a chamfer is disposed on an outer surface of a middle position of the pull rod 4, for facilitating the pull rod 4 being rotated to get removed from the threaded hole 21 of the guide ring 2 after use. A bottom end of the pull rod 4 has a tapered surface 41, and the pull rod 4 may apply a radial pressure to the inner hole coating via the tapered surface 41 and the assisting assembly 3.

In order to allow the conversion head 31 to slide freely during the test, a certain gap is disposed between a fitting surface of the guide groove 22 and the conversion head 31, thereby a limit hole is disposed on the guide ring 2, the limit rod 7 is threadedly connected inside the limit hole, and a bottom end of the limit rod 7 is capable of being abutted against the conversion head 31. During the test, the conversion head 31 is pressed by the limit rod 7 to avoid an inaccurate test result caused by the conversion head 31 turning over.

In one embodiment, the pull rod 4 is pushed inwardly along the threaded hole 21 until the tapered surface 41 of the pull rod 4 is abutted against the conversion head 31 to apply the radial pressure to the conversion head 31, and to transfer the radial pressure to the inner hole coating via the friction rod 33 and the friction head 32, so that the friction head 32 is in close contact with the inner hole coating and keep in close contact with the inner hole coating for a set period of time to ensure the adhesive strength.

When an axial tension is applied to the pull rod 4, the axial tension is transmitted to the conversion head 31 via the guide ring 2 due to the threaded connection between the pull rod 4 and the guide ring 2, and then transmitted to the inner hole coating via the friction rod 33 and the friction head 32, so that the inner hole coating is subjected to the axial tension.

The pull rod 4 has a hollow interior, the press rod 5 is slidably disposed in the pull rod 4, and the press rod 5 and the pull rod 4 are coaxially disposed. Both the pull rod 4 and the press rod 5 may pass through the upper cover 12, and the upper cover 12 arranged in a ring shape will not interfere with other components arranged inside the sample to be tested 10.

The pull hook 6 is rotatably connected to the guide ring 2. A bottom end of the press rod 5 is capable of being abutted against one end of the pull hook 6, and another end of the pull hook 6 is capable of being abutted against the assisting assembly 3, and the press rod 5 is capable of applying a radial tension to the inner hole coating via the pull hook 6 and the assisting assembly 3.

The conversion head 31 is provided with a limit protrusion, and the pull hook 6 is capable of being abutted against the limit protrusion. When the press rod 5 presses down one end of the pull hook 6, the pull hook 6 is rotated, and another end of the pull hook 6 is abutted against the assisting assembly 3 to apply the radial tension to the assisting assembly 3, thereby applying the radial tension to the inner hole coating.

The press rod 5 includes a rod body and a limit portion disposed at a top end of the rod body, and a diameter of the limit portion is greater than a diameter of the rod body. Threads are disposed on an outer surface of the limit portion to facilitate loading of the tensile testing machine. Each assisting assembly 3 is correspondingly provided with a respective pull hook 6, and the bottom end of the press rod 5 may simultaneously apply force to all pull hooks 6, thereby simultaneously driving all the assisting assembly 3 to move synchronously to achieve automatic centering, so that the guide ring 2 is located at a middle position of the sample to be tested.

In one embodiment, when the axial pressure is applied to the press rod 5, the bottom end of the press rod 5 presses down the pull hook 6 to rotate the pull hook 6, and an end portion of the pull hook 6 is abutted against the assisting assembly 3 to apply the radial tension to the assisting assembly 3, thereby applying the radial tension to the inner hole coating. When the radial tension is great enough, the inner hole coating will peel off from the sample to be tested 10. A simple pull hook 6 converts the axial pressure applied on the press rod 5 into the radial tension, which solves a problem that a radial tension is difficult to be applied on the curved surface of the inner hole.

Figure 10:
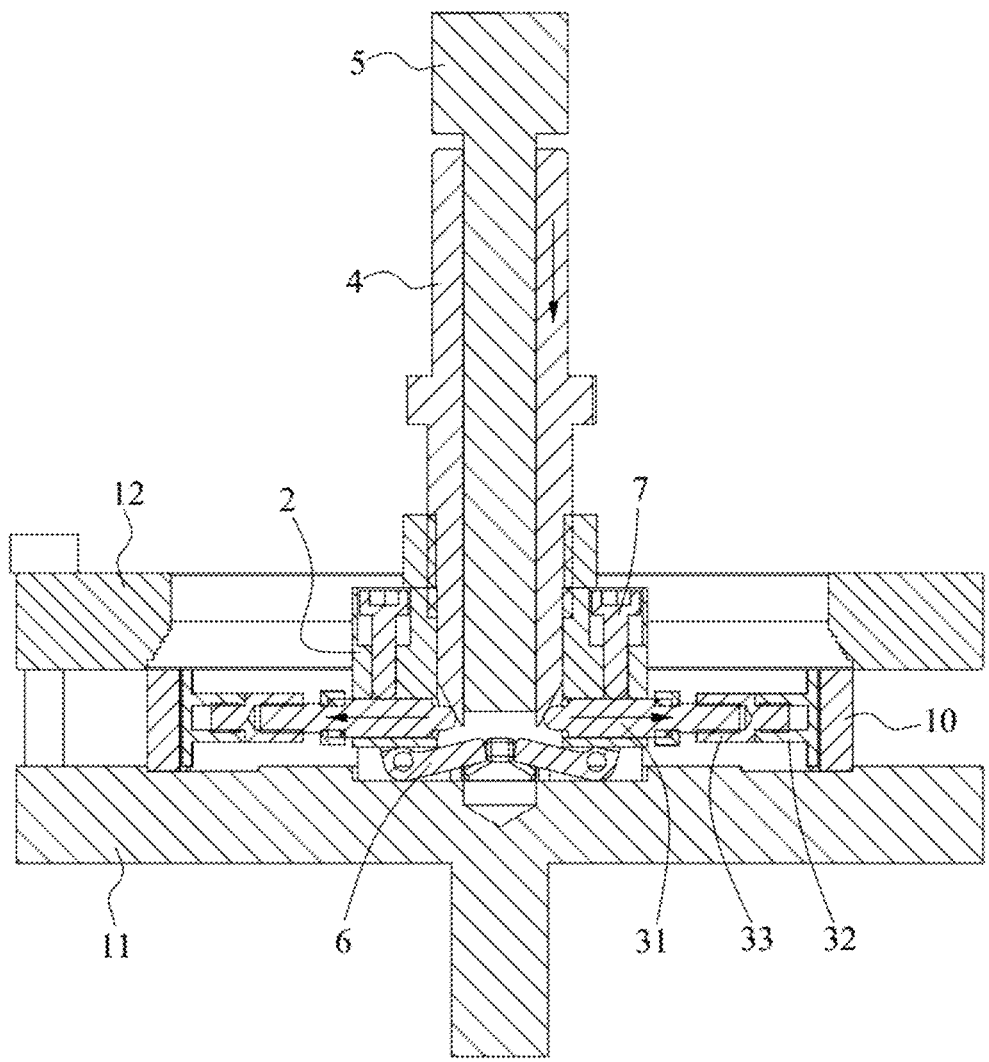
FIG. 10 is a schematic diagram of a preparing stage of a testing method for adhesive strength of an inner hole coating according to an embodiment of the present disclosure.
Figure 11:
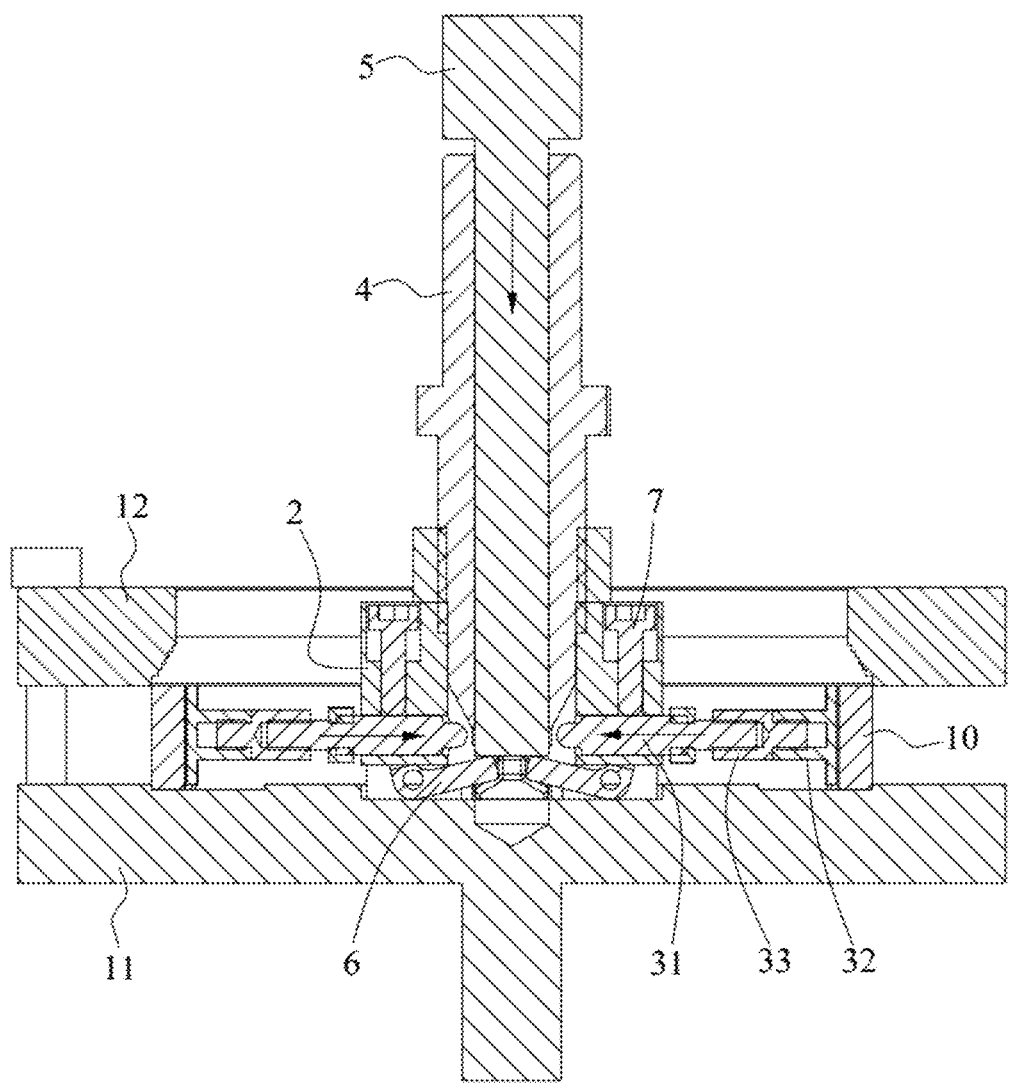
FIG. 11 is a schematic diagram of a tensile adhesive strength test of the testing method for adhesive strength of the inner hole coating according to an embodiment of the present disclosure.
Figure 12:
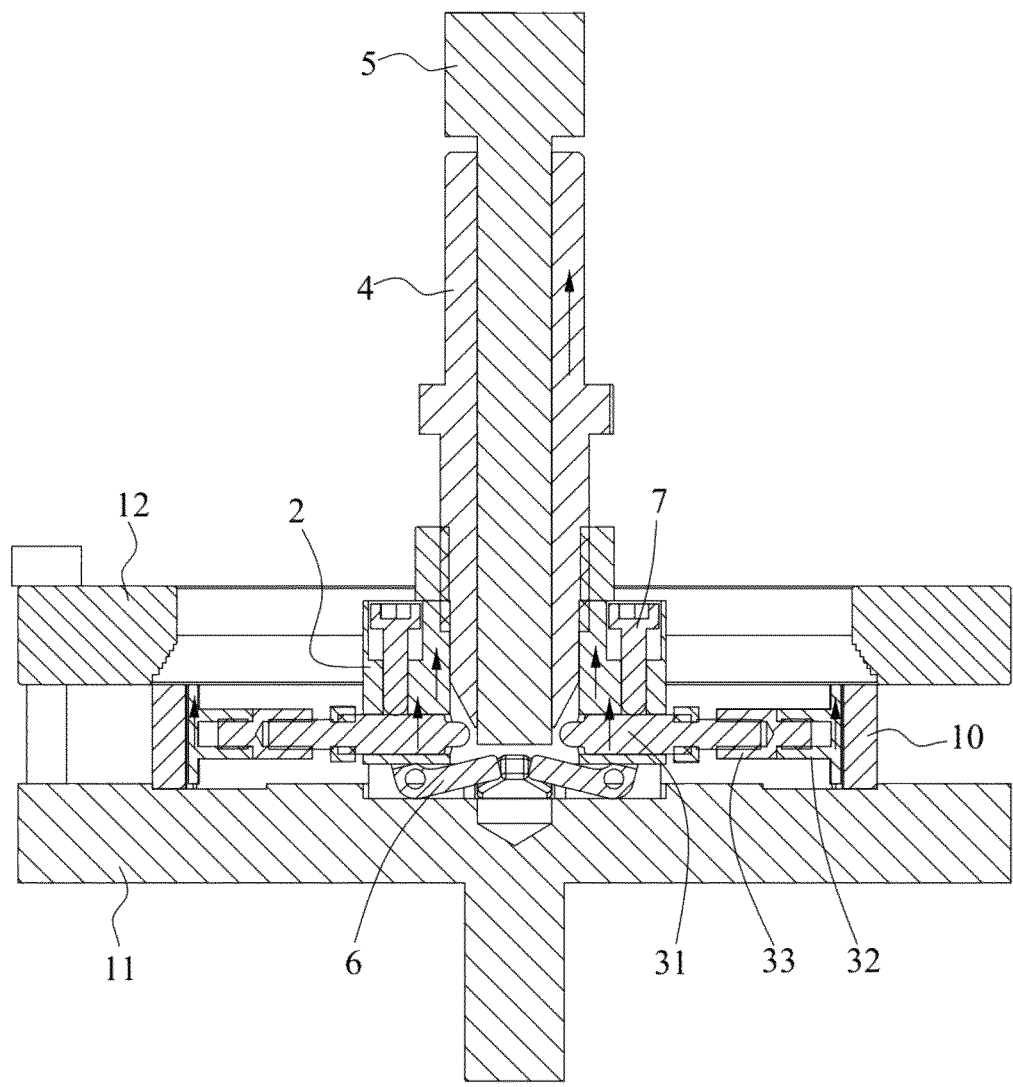
FIG. 12 is a schematic diagram of a shear adhesive strength test of the testing method for adhesive strength of the inner hole coating according to an embodiment of the present disclosure.

Referring to FIGS. 10 to 12, further provided is a testing method for adhesive strength of an inner hole coating, the testing method adopts the above-mentioned testing device for adhesive strength of an inner hole coating, and includes a preparing stage, a tensile adhesive strength test and a shear adhesive strength test. A force direction is indicated by an arrow in the drawings.

Referring to FIG. 10, in the preparing stage, the pull rod 4 is pushed inwardly along the threaded hole 21 until the tapered surface 41 is abutted against the assisting assembly 3 to apply the radial pressure to the assisting assembly 3 via the pull rod 4, so that the assisting assembly 3 is in close contact with the inner hole coating and keep in close contact with the inner hole coating for a set time, and the pull rod 4 is reset. In one embodiment, the pull rod 4 is pushed inwardly along the threaded hole 21 until the tapered surface 41 is abutted against the conversion head 31, for example, the pull rod 4 moves vertically downward in FIG. 11, so that the conversion head 31 is subjected to a pushing force outward along the radial direction so as to apply the radial pressure to the inner hole coating via the friction rod 33 and the friction head 32, so that the friction head 32 is in close contact with the inner hole coating and keep in close contact with the inner hole coating for a certain time under a condition of set temperature, so that the adhesive layer is cured.

In order to keep a contact area between the friction head 32 and the inner hole coating be a constant value, the coating on an wall surface of the inner hole and located around the friction head 32 is generally removed after the preparation of the inner hole coating is finished, so that the contact area between the friction head 32 and the inner hole coating is an area of an arc surface of the friction head 32.

Referring to FIG. 11, in the tensile adhesive strength test, an axial pressure is applied to the press rod 5, for example, the press rod 5 is subjected to an axial pressure vertically downward in FIG. 11, so that the press rod 5 slides along the pull rod 4 to abut against one end of the pull hook 6, one end of the pull hook is subjected to a downward pressure to rotate the pull hook 6 relative to a guide ring 2, so that another end of the pull hook 6 is abutted against the assisting assembly 3, so as to apply a radial tension to the assisting assembly 3, the assisting assembly 3 is subjected to the radial tension inwardly along a radial direction, so that the inner hole coating is subjected to the radial tension, and a magnitude of the axial pressure on the press rod 5 is recorded at a moment when the inner hole coating is peeled off.

A tensile adhesive strength calculation formula of the inner hole coating is as follows:

$$R_H = (F^* L_1)/(L_2 ^* S^* N) = (F^* L_1)/(L_2 ^* R^* \theta^* H^* N)$$

Where, F indicates a magnitude of the axial pressure on the press rod;

$L_1$ indicates a length of a force arm of a force of the press rod acting on the pull hook;

$L_2$ indicates a length of a force arm of a force of the pull hook acting on the conversion head;

S indicates a contact area between a single friction head and the inner hole coating;

N indicates a number of the friction heads;

R indicates a radius of the curved surface corresponding to a single friction head;

θ indicates a radian angle corresponding to a single friction head; and

H indicates a height of the friction head.

Referring to FIG. 12, in the shear adhesive strength test, the axial tension is applied to the pull rod 4, for example, the pull rod 4 is subjected to a vertical upward axial tension in FIG. 12, so that the axial tension is transmitted along the guide ring 2 to the assisting assembly 3 so as to apply the axial tension to the assisting assembly 3, so that the inner hole coating is subjected to the axial tension, and a magnitude of the axial tension on the pull rod 4 is recorded at a moment when the inner hole coating is peeled off.

When the pull rod 4 is subjected to the axial tension, the pull rod 4 is locked to the guide ring 2 under the action of the threads. The axial tension on the pull rod 4 may be transmitted to the conversion head 31 along the guide ring 2 and then applied to the inner hole coating via the friction rod 33 and the friction head 32. The axial tension applied to the pull rod 4 is uniformly applied to the inner hole coating, such that a problem that the inner hole member is difficult to simulate an actual working condition to test the shear adhesive strength is solved.

A shear adhesive strength calculation formula is as follows:

$$\sigma_\tau = T/(N*S) = T/(N*R*\theta*H)$$

Where, T indicates the axial tension on the pull rod;

N indicates a number of the friction heads;

S indicates a contact area between a single friction head and the inner hole coating;

R indicates a radius of a circle corresponding to a single friction head;

θ indicates a radian angle corresponding to a single friction head; and

H indicates a height of the friction head.

In summary, the following functions are achieved by using the above-mentioned testing device for adhesive strength of an inner hole coating:

1. Simple and convenient tests for two kinds of adhesive strength of an inner wall coating of an inner hole member are achieved The tension or pressure applied to the pull rod 4 or the press rod 5 is converted into the shear force or tension applied to the surface of the inner hole coating via the device, and an instantaneous force at a moment when the inner hole coating peels off may be substituted into the formula to calculate the adhesive strength of the inner hole coating. Only one device is needed to achieve test of the shear adhesive strength and tensile adhesive strength of the inner hole coating, and test modes are convenient to be switched according to actual needs, or a simultaneous testing of the two is more convenient to comprehensively examine the actual performance to determine whether the inner hole coating will peel off and fail during service.

2. The tests for adhesive strength of inner wall coatings of inner hole members with different diameter are achieved The plurality of limit surfaces 121 arranged in the stepped shape and located on the upper cover 12 may position samples to be tested 10 with different diameters. When a large difference is provided in sizes of diameters of the inner hole members to be tested, the adhesive strength test of the inner hole coating may be achieved by using and combining different numbers of friction rods 33 and friction heads 32. When a small difference is provided in sizes of the diameters of the inner hole members to be tested, a radial position of the conversion head 31 may be fine-tuned directly by rotating the pull rod 4, where the operation is simple, and the connection is reliable.

3. Integration of a load-holding device and a testing device is achieved

When glued with the friction head 32, the inner hole coating needs to be performed with load-holding and may automatically centered to tightly combine the inner hole coating and the friction head 32. The device may perform load-holding by rotating the pull rod 4 without additional devices, which reduces cost of the test and saves time for frequent replacement of different devices to improve efficiency.

The above embodiments describe only the basic principles and characteristics of the present disclosure and the present disclosure is not limited to the above embodiments. Various modifications and changes may be made in the present disclosure without departing from the spirit and scope of the present disclosure. These modifications and changes fall within the scope of the present disclosure. The scope of the present disclosure is defined by the appended claims and equivalents thereof.

What is claimed is:

1. A testing device for adhesive strength of an inner hole coating, comprising:
   a positioning assembly configured to clamp a sample to be tested;
   a guide ring disposed at a center position of the sample to be tested, wherein the guide ring has a threaded hole disposed along an axial direction of the guide ring and a guide groove disposed along a radial direction of the guide ring, the guide groove is communicated with the threaded hole;
   an assisting assembly, wherein one end of the assisting assembly is inserted into the guide groove, and another end of the assisting assembly is adhesive to the inner hole coating of the sample to be tested;
   a pull rod threadedly connected to the threaded hole, wherein the pull rod has a hollow interior, a bottom end of the pull rod has a tapered surface, the pull rod is configured to apply an axial tension to the inner hole coating via the guide ring and the assisting assembly, and apply a radial pressure to the inner hole coating via the tapered surface and the assisting assembly;
   a press rod slidably disposed in the pull rod and coaxially disposed with the pull rod; and
   a pull hook rotatably connected to the guide ring, wherein a bottom end of the press rod is capable of being abutted against one end of the pull hook, and another end of the pull hook is capable of being abutted against the assisting assembly, and the press rod is capable of applying a radial tension to the inner hole coating via the pull hook and the assisting assembly.

2. The testing device for the adhesive strength of the inner hole coating according to claim 1, wherein the assisting assembly comprises:
   a conversion head inserted into the guide groove;
   a friction head adhered to the inner hole coating; and
   a friction rod, wherein one end of the friction rod is fixedly connected to the conversion head, and another end of the friction rod is fixedly connected to the friction head.

3. The testing device for the adhesive strength of the inner hole coating according to claim 2, wherein a limit protrusion is disposed on the conversion head, and the pull hook is capable of being abutted against the limit protrusion.

4. The testing device for the adhesive strength of the inner hole coating according to claim 2, wherein a limit hole is disposed on the guide ring, a limit rod is threadedly connected inside the limit hole, and a bottom end of the limit rod is capable of being abutted against the conversion head.

5. The testing device for the adhesive strength of the inner hole coating according to claim 1, wherein the positioning assembly comprises:
a base, wherein the sample to be tested and the guide ring each are disposed on the base; and
an upper cover abutted against the sample to be tested, wherein the upper cover is locked to the base by a fastener, the upper cover is ring-shaped, and the pull rod and the press rod are capable of passing through the upper cover.

6. The testing device for the adhesive strength of the inner hole coating according to claim 5, wherein a plurality of limit surfaces are annularly provided on an inner wall of the upper cover, and arranged in a stepped shape, and the sample to be tested is capable of being abutted against the plurality of limit surfaces.

7. The testing device for the adhesive strength of the inner hole coating according to claim 5, wherein a positioning groove is disposed on the base, and one end of the sample to be tested is located in the positioning groove.

8. The testing device for the adhesive strength of the inner hole coating according to claim 1, wherein the press rod comprises a rod body and a limit portion disposed at a top end of the rod body, and a diameter of the limit portion is greater than a diameter of the rod body.

9. The testing device for the adhesive strength of the inner hole coating according to any one of claim 1, wherein at least two assisting assemblies are provided, and the at least two assisting assemblies are evenly distributed around a circumferential direction of the guide ring, and each assisting assemblies is provided with one guide groove and one pull hook, correspondingly.

10. A testing method for adhesive strength of an inner hole coating, adopting a testing device for adhesive strength of an inner hole coating,
wherein the testing device for adhesive strength of an inner hole coating comprises:
a positioning assembly configured to clamp a sample to be tested;
a guide ring disposed at a center position of the sample to be tested, wherein the guide ring has a threaded hole disposed along an axial direction of the guide ring and a guide groove disposed along a radial direction of the guide ring, the guide groove is communicated with the threaded hole;
an assisting assembly, wherein one end of the assisting assembly is inserted into the guide groove, and another end of the assisting assembly is adhesive to the inner hole coating of the sample to be tested;
a pull rod threadedly connected to the threaded hole, wherein the pull rod has a hollow interior, a bottom end of the pull rod has a tapered surface, the pull rod is configured to apply an axial tension to the inner hole coating via the guide ring and the assisting assembly, and apply a radial pressure to the inner hole coating via the tapered surface and the assisting assembly;
a press rod slidably disposed in the pull rod and coaxially disposed with the pull rod; and
a pull hook rotatably connected to the guide ring, wherein a bottom end of the press rod is capable of being abutted against one end of the pull hook, and another end of the pull hook is capable of being abutted against the assisting assembly, and the press rod is capable of applying a radial tension to the inner hole coating via the pull hook and the assisting assembly,
wherein the testing method comprises:
a preparing stage: pushing a pull rod inwardly along a threaded hole until a tapered surface abuts against a assisting assembly to apply a radial pressure to the assisting assembly via the pull rod, so that the assisting assembly is in close contact with the inner hole coating and keep in close contact with the inner hole coating for a set time, and resetting the pull rod;
a tensile adhesive strength test: applying a axial pressure to a press rod, so that the press rod slides along the pull rod to abut against one end of the pull hook and the pull hook rotates relative to a guide ring, then another end of the pull hook is abutted against the assisting assembly, so as to apply a radial tension to the assisting assembly, and then the inner hole coating is subjected to the radial tension; and recording a magnitude of the axial pressure on the press rod at a moment when the inner hole coating is peeled off; and
a shear adhesive strength test: applying an axial tension to the pull rod, so that the axial tension is transmitted along the guide ring to the assisting assembly so as to apply the axial tension to the assisting assembly, then the inner hole coating is subjected to the axial tension; and recording a magnitude of the axial tension on the pull rod at a moment when the inner hole coating is peeled off.

11. The testing method for the adhesive strength of the inner hole coating according to claim 10, wherein the assisting assembly comprises:
a conversion head inserted into the guide groove;
a friction head adhered to the inner hole coating; and
a friction rod, wherein one end of the friction rod is fixedly connected to the conversion head, and another end of the friction rod is fixedly connected to the friction head.

12. The testing method for the adhesive strength of the inner hole coating according to claim 11, wherein a limit protrusion is disposed on the conversion head, and the pull hook is capable of being abutted against the limit protrusion.

13. The testing method for the adhesive strength of the inner hole coating according to claim 11, wherein a limit hole is disposed on the guide ring, a limit rod is threadedly connected inside the limit hole, and a bottom end of the limit rod is capable of being abutted against the conversion head.

14. The testing method for the adhesive strength of the inner hole coating according to claim 10, wherein the positioning assembly comprises:
a base, wherein the sample to be tested and the guide ring each are disposed on the base; and
an upper cover abutted against the sample to be tested, wherein the upper cover is locked to the base by a fastener, the upper cover is ring-shaped, and the pull rod and the press rod are capable of passing through the upper cover.

15. The testing method for the adhesive strength of the inner hole coating according to claim 14, wherein a plurality of limit surfaces are annularly provided on an inner wall of the upper cover, and arranged in a stepped shape, and the sample to be tested is capable of being abutted against the plurality of limit surfaces.

16. The testing method for the adhesive strength of the inner hole coating according to claim 14, wherein a positioning groove is disposed on the base, and one end of the sample to be tested is located in the positioning groove.

17. The testing method for the adhesive strength of the inner hole coating according to claim 10, wherein the press rod comprises a rod body and a limit portion disposed at a top end of the rod body, and a diameter of the limit portion is greater than a diameter of the rod body.

18. The testing method for the adhesive strength of the inner hole coating according to claim 10, wherein at least two assisting assemblies are provided, and the at least two assisting assemblies are evenly distributed around a circumferential direction of the guide ring, and each assisting assemblies is provided with one guide groove and one pull hook, correspondingly.

\* \* \* \* \*